(12) United States Patent
Buchacher

(10) Patent No.: US 9,374,248 B2
(45) Date of Patent: Jun. 21, 2016

(54) RECEIVER CIRCUIT AND METHOD PERFORMED BY A RECEIVER CIRCUIT FOR DETERMINING A CHANNEL ESTIMATE

(75) Inventor: Clemens Buchacher, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 138 days.

(21) Appl. No.: 13/458,056

(22) Filed: Apr. 27, 2012

(65) Prior Publication Data

US 2013/0287078 A1 Oct. 31, 2013

(51) Int. Cl.
*H04L 25/02* (2006.01)
(52) U.S. Cl.
CPC .................................. *H04L 25/0232* (2013.01)
(58) Field of Classification Search
USPC .................................. 375/224, 341, 340, 316
See application file for complete search history.

(56) References Cited

U.S. PATENT DOCUMENTS

| | | | | |
|---|---|---|---|---|
| 2005/0078742 A1* | 4/2005 | Cairns et al. | .................. | 375/148 |
| 2008/0025200 A1* | 1/2008 | Tiirola et al. | ................. | 370/210 |
| 2010/0074320 A1* | 3/2010 | Park et al. | ..................... | 375/233 |
| 2010/0272204 A1* | 10/2010 | Fazel et al. | ..................... | 375/267 |
| 2013/0083778 A1* | 4/2013 | Wang | ............................ | 370/335 |

FOREIGN PATENT DOCUMENTS

| CN | 101346924 A | 1/2009 |
|---|---|---|
| CN | 101601193 A | 12/2009 |

OTHER PUBLICATIONS

Dietrich, Frank A., et al., "Pilot-Assisted Channel Estimation Based on Second-Order Statistics", IEEE, vol. 53, No. 3, pp. 1178-1193, Mar. 2005. 16 Pages.

Tresch, Roland, et al., "LMMSE Channel Estimation for MIMO W-CDMA with Out-of-Cell Interfrerence Mitigation", Conference Record of the 42nd asilomar Conference on Signals, Systems and Computers, Pacific Grove, CA, U.S.A., Oct. 2008. 5 Pages.

Mehlfuehrer, Christian et al., "Novel Tap-wise LMMSE Channel Estimation for MIMO W-CDMA" in Proc. of 51st Annual IEEE Global Telecommunications Conference, New Orleans, USA, Nov. 2008. 6 Pages.

* cited by examiner

*Primary Examiner* — Eva Puente
(74) *Attorney, Agent, or Firm* — Eschweiler & Associates, LLC

(57) ABSTRACT

A method includes a step of correlating a received signal with a pilot sequence to determine a correlation result. The method further includes a step of determining a channel estimate based on a Minimum Mean Square Error scheme that is conditional to an observed parameter, wherein the observed parameter includes the correlation result.

23 Claims, 8 Drawing Sheets

Vehicular A 30 km/h

Pedestrian A 3 km/h

Pedestrian B 3 km/h

Vehicular A 120 km/h

RECEIVER CIRCUIT AND METHOD PERFORMED BY A RECEIVER CIRCUIT FOR DETERMINING A CHANNEL ESTIMATE

FIELD

The invention relates to mobile communications. More particular, the invention relates to receiver circuits and methods performed by receiver circuits.

BACKGROUND

Receiver circuits may estimate properties of transmission channels. Estimated channel properties may be used for equalizing signals. Receiver circuits and methods performed by receiver circuits constantly have to be improved. In particular, it may be desirable to improve a quality and a performance of receiver circuits and methods performed therein.

BRIEF DESCRIPTION OF THE DRAWINGS

Aspects of the disclosure are made more evident by way of example in the following detailed description when read in conjunction with the attached drawing figures, wherein.

DETAILED DESCRIPTION

Figure 1:
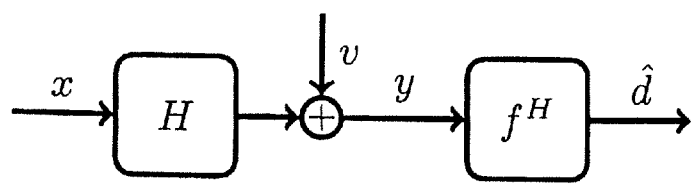
FIG. 1 is a schematic block diagram of a radio communications system 100.

In the following detailed description, reference is made to the accompanying drawings, which form a part thereof, and in which are shown by way of illustration embodiments in which the disclosure may be practiced. It is understood that further embodiments may be utilized and structural or logical changes may be made without departing from the scope of the present disclosure. It is further understood that the features of the various exemplary embodiments described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

It is understood that embodiments may be implemented in discrete circuits, partially integrated circuits or fully integrated circuits. Further, devices in accordance with the disclosure may be implemented on a single semiconductor chip or on multiple semiconductor chips connected to each other.

Furthermore, it is understood that embodiments may be implemented in software or in dedicated hardware or partially in software and partially in dedicated hardware. For example, a mere correlation of signals may be performed by a correlator implemented in hardware while a computation of complex parameters may be implemented in software e.g. running on a digital signal processor.

The methods and receiver circuits described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

The methods and receiver circuits described herein may be used for High Speed Downlink Packet Access (HSDPA) which has been introduced into the Release 5 (Rel-5) version of UMTS standards based on W-CDMA multiple access schemes by the "3rd Generation Partnership Project" (3GPP) standardization. HSDPA represents an enhanced 3G mobile radio communications protocol in the High Speed Packet Access (HSPA) family. HSDPA allows networks based on UMTS to provide higher data transfer speeds and capacity. Current HSDPA deployments may support down-link speeds of 1.8, 3.6, 7.2 and 14.0 Mbit/s. Further speed increases may be available with HSDPA+ which may provide speeds of up to 42 Mbit/s and 84 Mbit/s with Release 9 of the 3GPP standards.

In radio communications systems, a transmitter transmitting one or more radio communications signals over one or more radio communications channels may be present. The transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver or mobile station. By way of example, a mobile station may be represented by a cellular phone, a smartphone, a tablet PC, a laptop, etc. Note that a base station may also be referred to as "Node B" or "eNode B" and a mobile station may also be referred to as "User Equipment" (UE). In the following, the respective terms shall have the same meaning, which meaning shall include the definitions given in the various standards (e.g. UMTS, LTE and derivatives thereof).

In the following specification, various methods and receiver circuits are described separately or with reference to each other. It is understood that comments made in connection with a described method may also hold true for a corresponding receiver circuit configured to perform the method and vice versa. For example, if a specific method step is specified, a corresponding receiver circuit may include a unit to perform the described method step, even if such a unit is not explicitly described or illustrated in the figures.

Throughout this specification, the following notations and relations may be used.

I denotes a unit matrix. 0 denotes a zero matrix. $e_n$ denotes an n-th Euclidean standard basis vector. The operation $(\cdot)^T$ denotes transposition. The operation $(\cdot)^H$ denotes conjugate transposition. The operation $(\cdot)^*$ denotes complex conjugation. For a function X, the operation arg min $X(\cdot)$ denotes a point where X is minimal. The operation $E(\cdot)$ denotes an expectation operator.

A delta function may be expressed by $$\delta_{m,n} = \begin{cases} 1 & \text{if } m = n \\ 0 & \text{otherwise.} \end{cases} \quad (1)$$

A vector norm of a vector x with respect to a positive definite matrix A may be expressed by $$\|x\|_A = \sqrt{x^H A x}. \quad (2)$$

For a matrix A of dimension n×n having elements $a_{i,j}$, a Toeplitz matrix $$B = \text{toeptr} A \quad (3)$$

may be expressed by $$b_{i,j} = \sum_{k=0}^{n-1-|i-j|} a_{\max(0,i-j)+k, \max(0,j-i)+k}, \quad (4)$$

i.e. elements of the n-th off diagonal of B have a value of the sum of the n-th off diagonal of A.

$N(x_0, C)$ denotes a multivariate circular-symmetric complex Gaussian distribution in n variables with mean $x_0$ and covariance matrix C as defined by a probability density function $$p(x) = \frac{1}{\pi^n \det C} \exp(-\|x - x_0\|_{C^{-1}}^2). \quad (5)$$

FIG. 1 schematically illustrates a radio communications system 100. A signal x is broadcast by a transmitter (not illustrated), e.g. a base station, via a channel H that may influence the signal. In addition, the transmit signal may be influenced by noise v (see adder). A signal y may be received by a receiver circuit including an equalizer (or filter) $f^H$. The equalizer $f^H$ may output an equalized signal, for example in the form of chips $\hat{d}$. Filter coefficients used by the equalizer $f^H$ may depend on an estimation of the transmission channel.

In the following, a scheme for estimating a channel and equalizing signals is described. For example, the scheme may be used in connection with the radio communications system 100.

The received signal vector y may be expressed by $$y = Hx + v \quad (6)$$

wherein the noise vector v is of dimension L×1 and e.g. $v \sim N(0, C_v)$. The noise vector v may model all interference from other cells. A variable $h \sim N(0, C_h)$ may denote a channel impulse response of dimension L×1 wherein an associated channel convolution matrix of dimension L×(2L−1) may be expressed by $$H = \begin{bmatrix} h_0 & h_1 & \ldots & h_{L-1} & 0 & \ldots & 0 \\ 0 & h_0 & \ldots & & h_{L-1} & \ddots & \vdots \\ \vdots & \ddots & \ddots & & & \ddots & 0 \\ 0 & \ldots & 0 & h_0 & \ldots & \ldots & h_{L-1} \end{bmatrix}. \quad (7)$$

Note that the parameter L may take arbitrary values depending on the regarded system. For HSDPA, L may e.g. have a value between 10 and 30, in particular a value of 20.

The transmit signal vector x is of dimension (2L−1)×1 and may be expressed by a sum of spread and scrambled symbol sequences $x_k$, i.e.

$$x = \sum_{k=1}^{K} x_k. \quad (8)$$

Each of the transmit signal vector x, the receive signal vector y and the noise vector v may be a vectorized version of a time series with chip index n. A j-th element of x(n) may be the (j−1)-th element of x(n+1).

Spreading codes used for generating a spread signal y may be a point-wise product of a channelization code and a scrambling code. The channelization codes may be orthogonal variable spreading factor codes that may be orthogonal such that for all values of k, k', N $$\frac{1}{N} \sum_{n=1}^{N} x_{k,L}(n) x_{k',L}^*(n) = \delta_{k,k'} P_k, \quad (9)$$

if the spreading factor of $x_k$ divides N. Here, $x_{k,L}(n)$ is the L-th element of $x_k$ at the chip of index n.

Scrambling sequences used for generating a scrambled signal y may be a pseudo-random sequence of e.g. QPSK symbols which may be modeled as an uncorrelated random process such that $$|x_{k,L}(n)|^2 = P_k \quad (10)$$

and $$E(x_k(n) x_k^H(n)) = \delta_{k,k} P_k I \quad (11)$$

for all values of k, k', n. For example, a CDMA system such as UMTS may employ pseudo-random sequences which may have a length of one time frame, i.e. 38400 chips. The transmit powers $P_k$ may be normalized such that $$\sum_{k=1}^{K} P_k = 1 \quad (12)$$

Equations (11) and (12) imply $$E(xx^H) = I. \quad (13)$$

A Signal-to-Noise Ratio (SNR) may be expressed by an average Signal-to-Noise Power Ratio at a receiver where multipath interference is attributed to the signal power, i.e. by $$SNR=(C_y-C_v)_{1,1}/(C_v)_{1,1}. \quad (14)$$

A transmitter, e.g. a base station, may transmit a pilot sequence $x_1$ which may be deterministic and known to the receiver. The pilot sequence may particularly be used for estimating a multipath propagation channel. A correlation of the received signal y and the pilot sequence $x_1$ for a correlation length N may provide an least squares estimate $$\hat{h} = \frac{1}{P_1 N} \sum_{n=1}^{N} x^*_{1,L}(n) y(n) \quad (15)$$

of the channel h. Here, the chip sequences may start at $x_{k,L}(1)$. The correlation length N may depend on the regarded system. For example, the correlation length may take values lying between 10000 and 20000.

The considered channel h may be a multipath channel that may be modeled using a Doppler spectrum. In particular, correlation lengths N smaller than a channel coherence time may be considered such that a constant channel during each observation interval may be assumed. The receive signal y may be expressed by $$y = H e_L e_L^T x + v', \quad (16)$$

wherein $$v' = H(I - e_L e_T^T) x + v \quad (17)$$

may include signal contributions asynchronous to the correlation. The parameter $e_L$ corresponds to a unit vector of dimension L×1 having a one at index L and zeros otherwise.

Due to orthogonality of the spreading codes, after summing the correlated samples over n, the synchronous part of the receive signal y cancels except for contributions from $x_{1,L}$. Using $$h = H e_L, \quad (18)$$

the channel estimate $\hat{h}$ may be expressed by $$\hat{h} = h + \hat{v} \quad (19)$$

wherein the estimation error vector $\hat{v}$ may be written as $$\hat{v} = \frac{1}{P_1 N} \sum_{n=1}^{N} x^*_{1,L}(n) v'(n). \quad (20)$$

The parameter v' does not include contributions from $x_{1,L}$ such that the estimation error has zero mean and a covariance (or error covariance matrix) $C_{\hat{h}|h}$ may be expressed by $$C_{\hat{h}|h} = E(\hat{v}\hat{v}^H | h) = \frac{1}{P_1 N} (HH^H - hh^H + C_v). \quad (21)$$

The channel estimate may have a conditional distribution $$\hat{h}|h \sim N(h, C_{\hat{h}|h}). \quad (22)$$

Since the entire receive signal may be regarded as interference for the channel estimate, except for contributions synchronous to an estimated channel tap itself, the channel estimation error covariance may include an expression for the total receive signal auto-correlation $$C_{y|h} = E(yy^H|h) = HH^H + C_v. \quad (23)$$

A transmit chip may be expressed by $$d = e_L^T x. \quad (24)$$

The transmit chip may be estimated using a linear combination of receive samples, i.e.

$$\hat{d} = f^H y \quad (25)$$

wherein the length of f may particularly equal the channel length L. A Mean Square Error (MSE) cost function of f may be expressed by $$J(f|h) = E(|\hat{d} - d|^2 | h) \quad (26)$$

$$= E(f^H yy^H f - 2Re\{f^H yx^H e_L\} + 1 | h) \quad (27)$$

$$= f^H C_{y|h} f - 2Re\{f^H C_{yx|h} e_L\} + 1 \quad (28)$$

where $$C_{y|h} = E(yy^H|h) \quad (29)$$

and $$C_{yx|h} = E(yx^H|h) \quad (30)$$

The MSE function J may be minimized by coefficients $$f_\diamond = \arg\min J(\cdot | h) = C_{y|h}^{-1} C_{yx|h} e_L \quad (31)$$

that may be used as filter coefficients for an equalizer. Using the relations $$C_{y|h} = HH^H + C_v \quad (32)$$

and $$C_{yx|h} = H, \quad (33)$$

the filter coefficients of equation (31) may be expanded to $$f_\diamond = (HH^H + C_v)^{-1} h = (toeptr(hh^H) + C_v)^{-1} h. \quad (34)$$

Replacing the channel h with its estimate $\hat{h}$ thus results in filter coefficients $$f_\diamond = (toeptr(\hat{h}\hat{h}^H) + C_v)^{-1} \hat{h}. \quad (35)$$

The channel h may be estimated according to $$\hat{h}_{MMSE} = E(h|\hat{h}). \quad (36)$$

This estimator may depend on $C_{\hat{h}|h}$ (see equation (21)) which may depend on the channel itself. Since this may constitute a circular dependency, $C_{\hat{h}|h}$ may be approximated by its statistical average according to $$\bar{C}_{\hat{h}|h} = E_h(C_{\hat{h}|h}) = \frac{1}{P_1 N}(toeptr(C_h) - C_h + C_v). \quad (37)$$

Using a Gaussian approximation, a stationary Gaussian model with distributions $$h \sim N(0, C_h) \quad (38)$$

and $$\hat{h}|h \sim N(0, \bar{C}_{\hat{h}|h}) \quad (39)$$

and a cross-correlation matrix $$C_{\hat{h}h} = C_h \quad (40)$$

may be obtained.

For the case of multivariate complex Gaussian distributions $$y \sim N(0, C_y) \quad (41)$$

and $$x \sim N(0, C_x) \quad (42)$$

having a covariance matrix $C_{yx}$, a distribution of x given y may be expressed by $$x|y \sim N(C_{xy} C_y^{-1} y, C_x - C_{yx}^H C_y^{-1} C_{yx}). \quad (43)$$

Hence, applying relation (43) to distributions (38) and (39) may result in a distribution of h given ĥ

$$h|\hat{h} \sim N(\hat{h}_{MMSE}, C_{h|\hat{h}}) \quad (44)$$

wherein $$\hat{h}_{MMSE} = C_h C_{\hat{h}}^{-1} \hat{h} \quad (45)$$

and $$C_{h|\hat{h}} = C_h - C_h C_{\hat{h}}^{-1} C_h \quad (46)$$

$$= C_h C_{\hat{h}}^{-1} (C_{\hat{h}} - C_h) \quad (47)$$

and $$C_{\hat{h}} = C_h + \overline{C}_{\hat{h}|h}. \quad (48)$$

The parameter $C_{h|\hat{h}}$ may be referred to as channel estimation error statistics.

As can be seen from foregoing equations, the MMSE channel estimate $\hat{h}_{MMSE}$ may depend on channel statistics $C_h$ and $C_v$, which may also be referred to as channel covariance matrix and noise covariance matrix, respectively. For a time-variant channel h, the channel statistics $C_h$ and $C_v$ may be estimated indirectly using the statistics $$C_y = E(yy^H) = \text{toeptr} C_h + C_v \quad (49)$$

and $$C_{\hat{h}} = E(C_{\hat{h}|h}) = C_h + \frac{1}{P_1 N}(C_y - C_h). \quad (50)$$

Note that the parameter $P_1$ may particularly correspond to a ratio between the energy accumulated over one PN chip period to the total transmit power spectral density, i.e. Ec/Ior, of the CPICH. The parameter P1 may be determined by an estimation.

Corresponding estimators may be expressed by the channel statistics $$\hat{C}_y = \frac{1}{M} \sum_{m=1}^{M} y(m) y^H(m) \quad (51)$$

and $$\hat{C}_{\hat{h}} = \frac{1}{1 - 1/P_1 N} \left( \frac{1}{U} \sum_{u=1}^{U} \hat{h}(u) \hat{h}^H(u) - \frac{1}{P_1 N} \hat{C}_y \right). \quad (52)$$

Here, the averaging lengths M and U may depend on the considered system. In particular, values of M and U may be chosen such that an averaging is performed over a fading process, i.e. the averaging lengths are greater than the channel coherence time, in particular greater by one or several orders of magnitude. The lengths of M and U may thus also depend on the velocity of the receiver. For example, an averaging may be referred to as "long-term" if it is performed over a length of about 160 ms, i.e. N equals 1024, and each of M and U equals 600. A further exemplary length may be about 5 ms which approximately corresponds to a channel coherence time of about 3 km/h. For such exemplary case, an averaging may be referred to as "short-term".

The estimators of equation (51) and (52) may particularly be unbiased and their variance may particularly go to zero as M, U go to infinity. It may thus be assumed that a receiver knows $C_h$ and $C_y$ a priori. If the pulse shape has good decay properties, the estimates may be reduced to the main and a few off diagonals. Since $C_y$ is Toeplitz, it may be determined by a few elements of the first row. $C_v$ may be determined by the pulse shape and may be known a priori up to a scaling factor which may be inferred from one element of $$\hat{C}_v = \hat{C}_y - \text{toeptr} \hat{C}_{\hat{h}}. \quad (53)$$

Replacing the channel h with the MMSE channel estimate $\hat{h}_{MMSE}$ in equation (35), the equalizer (or filter) coefficients according to the presented scheme may be expressed by $$f_o = (\text{toeptr}(\hat{h}_{MMSE} \hat{h}_{MMSE}^H) + C_v)^{-1} \hat{h}_{MMSE}. \quad (54)$$

The filter coefficients of equation (54) do not account for a channel estimation error. It may be possible to consider such channel estimation error by substituting h with ĥ in equation (31). Resulting equalizer coefficients may then be expressed by $$f_* = \arg\min J(\cdot|\hat{h}) = C_{y|\hat{h}}^{-1} C_{yx|\hat{h}} e_L. \quad (55)$$

Using equations (45) and (46), the following relations may be obtained $$C_{y|\hat{h}} = E(C_{y|h}|\hat{h}) = E(\text{toeptr}(hh^H) + C_v|\hat{h}) \quad (56)$$

$$= \text{toeptr}(E(hh^H|\hat{h}) + C_v \quad (57)$$

$$= \text{toeptr}(C_{h|\hat{h}}) \quad (58)$$

$$= \text{toeptr}(\hat{h}_{MMSE} \hat{h}_{MMSE}^H + C_{h|\hat{h}}) + C_v \quad (59)$$

and $$C_{yx|\hat{h}} e_L = E(C_{yx|h} e_L|\hat{h}) = \hat{h}_{MMSE}. \quad (60)$$

Combining equations (55) to (60), the equalizer coefficients may be expressed by $$f_* = (\text{toeptr}(\hat{h}_{MMSE} \hat{h}_{MMSE}^H + C_{h|\hat{h}}) + C_v)^{-1} \hat{h}_{MMSE} \quad (61)$$

wherein $\hat{h}_{MMSE}$ and $C_{h|\hat{h}}$ may be expressed according to equations (45) and (46), respectively. Compared to the filter coefficients $f_o$ of equation (54), the filter coefficients $f_*$ of equation (61) also take into account the channel estimation error statistics $C_{h|\hat{h}}$. Note that, using the channel estimate $\hat{h}_{MMSE}$, the channel estimation error statistics does not necessarily change for each CPICH symbol according to the pseudo-random scrambling code such that the filter do not necessarily have to be re-computed for each symbol.

The above described scheme provides a possibility of determining a channel estimate and filter coefficients for filtering received signals. It is understood that, based on the above specified scheme, the channel estimate and the filter coefficients may be determined in various ways. For example, a correlation result ĥ may be determined first according to equation (15). Knowing the correlation result ĥ, channel statistics (or covariance matrices) $\hat{C}_y$ and $\hat{C}_{\hat{h}}$ may be determined using the estimators of equations (51) and (52). Note that, alternatively, the parameter $\hat{C}_y$ may be determined on the basis of expectation values $E(|y(n)^2|)$ and $E(C_{y|\hat{h}})$. Knowing $\hat{C}_y$ and $\hat{C}_{\hat{h}}$, a channel statistics $\hat{C}_v$ may be determined using equation (49). Note that the parameter $\hat{C}_v$ may be determined up to a scalar factor by merely taking into account the (1,1)-element of the matrix equation (49). Knowing the parameters $\hat{C}_{\hat{h}}$ and $\hat{C}_v$, the parameter $\overline{C}_{\hat{h}|h}$ may be determined on the basis of equation (37) such that the channel estimate $\hat{h}_{MMSE}$ may then be determined according to equations (45) and (48). Knowing the channel estimate $\hat{h}_{MMSE}$, filter coefficients may be determined on the basis of equation (54). Alternatively, an additional step of determining the parameter $C_{h|\hat{h}}$ according to equations (46) and (47) may be performed such that filter coefficients may be determined on the basis of equation (61) taking into account a channel estimation error statistics.

Note that the above described scheme may be seen as a channel estimation based on assuming the pilot sequence to be an unknown and random process. Instead of an entire received signal, outputs of a pilot correlator (see e.g. equation (15)) may be used as observations and some a-priori statistical knowledge of the received signal may be used (see e.g. equation (37)). From this a-priori information, the error covariance matrix of the pilot correlator output may be computed (see e.g. equation (21)) which may be used for determining filter coefficients.

Methods 200, 300 and 400 in accordance with the disclosure are described in the following. It is understood that each of the methods may be modified by adding further method steps. In particular, a method may be extended by one or more method steps described in connection with a respective other method. Further, additional method steps may be derived by all further parts of this specification, unless specifically noted otherwise. Note that the block diagrams illustrated in the following figures do not necessarily imply a specific chronological order of included method steps. Rather, the indicated method steps may be performed in an arbitrary order, if reasonable from a technical point of view. Further, one or more method steps may at least partially be performed at a same time or during a same time period. Of course, specified features of the individual methods may be combined in arbitrary ways resulting in further embodiments which are not explicitly described for the sake of simplicity.

Figure 2:
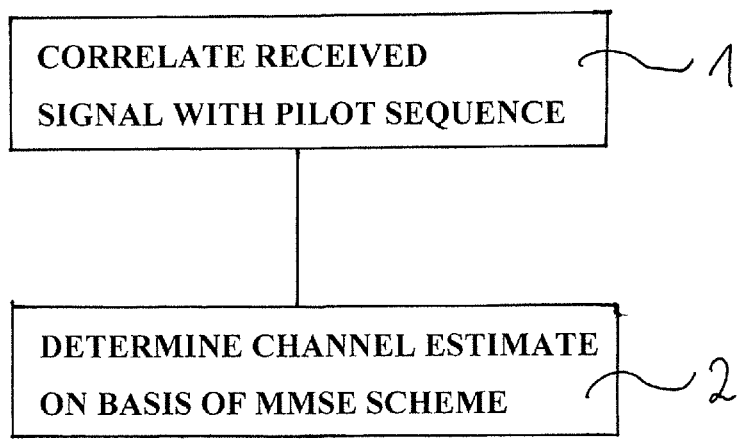
FIG. 2 is a flow chart diagram of a method 200 in accordance with the disclosure.

FIG. 2 schematically illustrates a method 200 in accordance with the disclosure including method steps 1 and 2. In method step 1, a received signal is correlated with a pilot sequence to determine a correlation result. For example, a correlation may be performed based on equation (15). In method step 2, a channel estimate is determined based on a Minimum Mean Square Error scheme that is conditional to an observed parameter wherein the observed parameter comprises the correlation result. For example, method step 2 may be based on equation (36). Note that the term "is conditional to" is known from statistics in the context of MMSE. In MMSE, a best guess for a random variable, e.g. a channel, may be determined, thereby minimizing the mean square error. It is understood that an MMSE scheme may also take into account one or more further random variables. In this case, an MMSE scheme may be utilized which is conditional to an observed parameter of such further random variable(s). Knowing an observed value (or parameter) of the further random variable, an estimate (or expectation value) determined by such MMSE scheme minimizes the mean square error and also provides the observed value. For example, an estimate of a random variable X which is conditional to a further random variable Y may be denoted as E(X|Y). Similarly, an estimate of a random variable X which is conditional to an observed parameter y of a further random variable Y may be denoted as E(X|Y=y).

The pilot sequence may include at least one of a spreading code and a scrambling code. For example, the pilot sequence may correspond to the chip sequence of equation (15) which may be based on equations (8) to (11).

The method 200 may further include a method step of determining an error covariance matrix based on the correlation result. For example, the method step may be based on equation (21).

The method 200 may further include a method step of determining a statistical average of an error covariance matrix wherein the statistical average depends on the correlation result and on a statistical property of the received signal. For example, the method step may be based on equation (37).

The channel estimate determined according to method step 2 may depend on a statistical average of the error covariance matrix. Such dependency may e.g. be based on equations (45) to (48).

The method step of determining the statistical average of the error covariance matrix may be independent of an explicit value of the pilot sequence. This may become apparent from equation (37) in which the statistical average $\overline{C}_{\hat{h}|h}$ does not explicitly depend on the value of the pilot sequence.

The method 200 may further include a method step of determining a first channel statistics based on the received signal wherein the channel estimate depends on the first channel statistics. For example, the method step may be based on equation (51).

The method 200 may further include a method step of determining a second channel statistics based on the correlation result wherein the channel estimate depends on the second channel statistics. For example, the method step may be based on equation (52).

The statistical average of the error covariance matrix may depend on at least one of the first channel statistics and the second channel statistics. Such dependency may e.g. become apparent from equation (37).

For example, at least one of the first channel statistics and the second channel statistics may be approximated by a diagonal matrix. Exemplary simulation results for such approximations are provided in connection with FIGS. 9A to 9D.

The method 200 may further include a method step of determining at least one filter coefficient based on the determined channel estimate. For example, the method step may be based on one of equations (54) and (61). The at least one filter coefficient may particularly depend on a channel estimation error statistics, see e.g. parameter $C_{h|\hat{h}}$ in equation (61).

The method 200 may further include a method step of filtering the received signal based on the at least one filter coefficient. A corresponding filter used for filtering the signal may e.g. include a Finite Impulse Response (FIR) filter.

Figure 3:
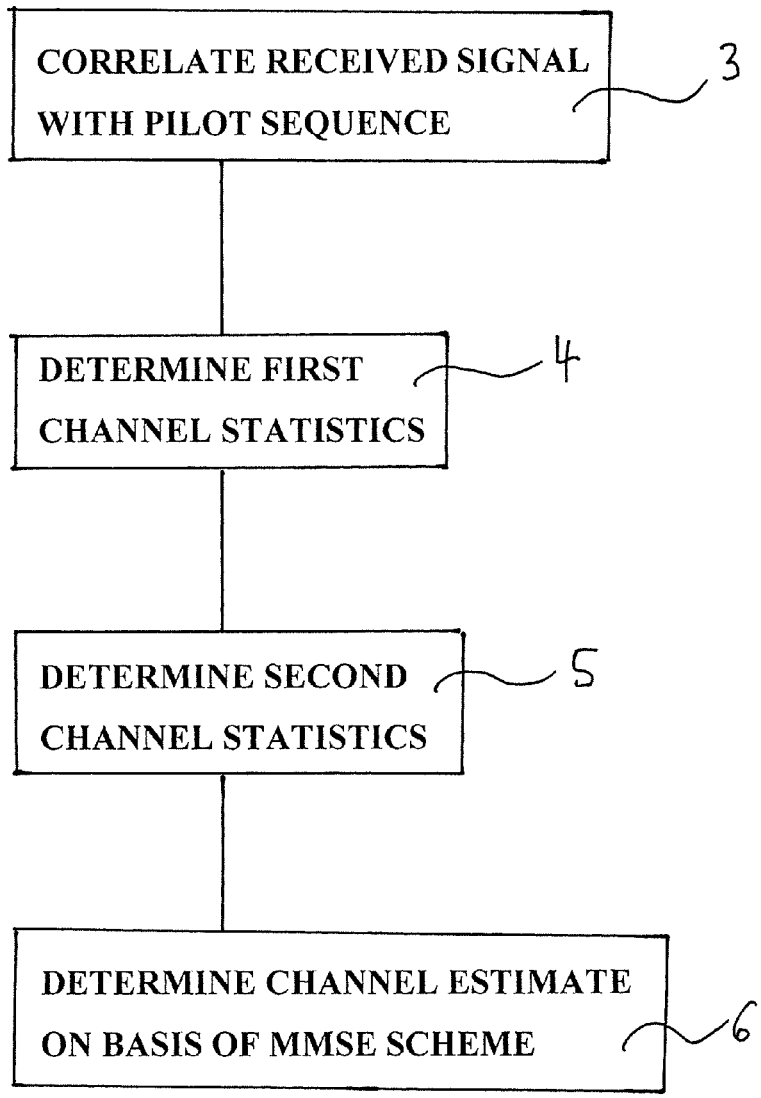
FIG. 3 is a flow chart diagram of a method 300 in accordance with the disclosure.

FIG. 3 schematically illustrates a method 300 in accordance with the disclosure including method steps 3 to 6. In method step 3, a received signal is correlated with a pilot sequence to determine a correlation result. For example, a correlation may be performed based on equation (15). In method step 4, a first channel statistics is determined based on the received signal. For example, method step 4 may be based on equation (51). In a method step 5, a second channel statistics is determined based on the correlation result. For example, method step 5 may be based on equation (52). In a method step 6, determining a channel estimate is determined based on a Minimum Mean Square Error scheme which is conditional to an observed parameter wherein the observed parameter comprises the correlation result and wherein the channel estimate depends on at least one of the first channel statistics and the second channel statistics. For example, method step 6 may be based on equation (36).

Figure 4:
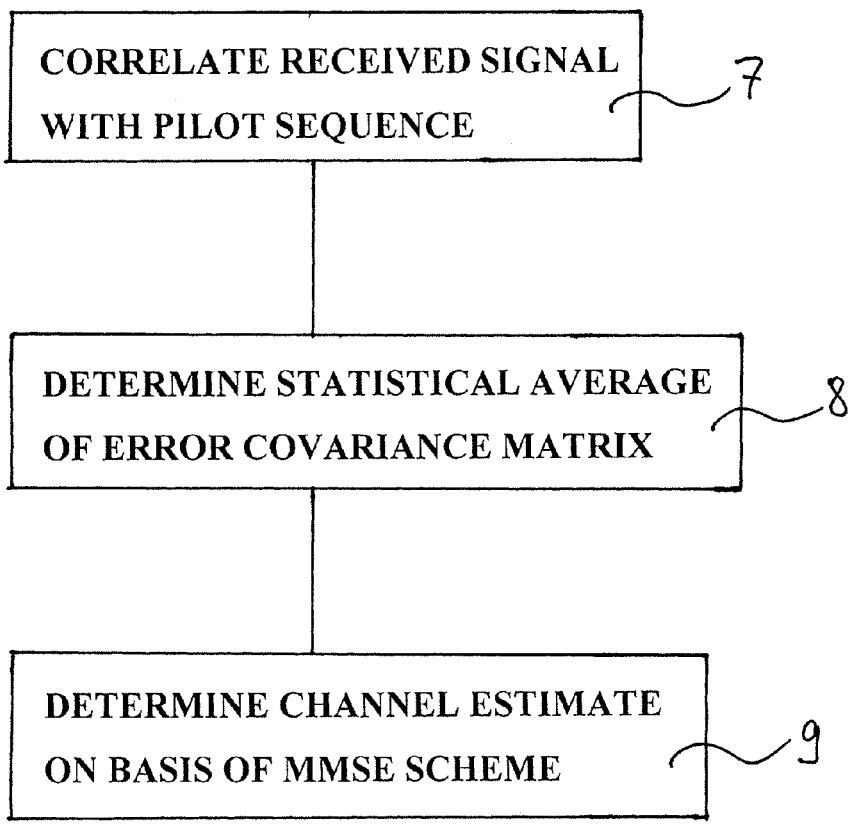
FIG. 4 is a flow chart diagram of a method 400 in accordance with the disclosure.

FIG. 4 schematically illustrates a method 400 in accordance with the disclosure including method steps 7 to 9. In method step 7, a received signal is correlated with a pilot sequence to determine a correlation result. For example, a correlation may be performed according to equation (15). In method step 8, a statistical average of an error covariance matrix is determined wherein the statistical average depends on the correlation result and on a statistical property of the received signal and wherein determining the statistical average of the error covariance matrix is independent of an explicit value of the pilot sequence. For example, method step 8 may be based on equation (37). In method step 9, a channel estimate is determined based on a Minimum Mean Square Error scheme that is conditional to an observed parameter wherein the observed parameter comprises the correlation result and wherein the channel estimate depends on the statistical average of the error covariance matrix. For example, method step 2 may be based on equation (36).

Figure 5:
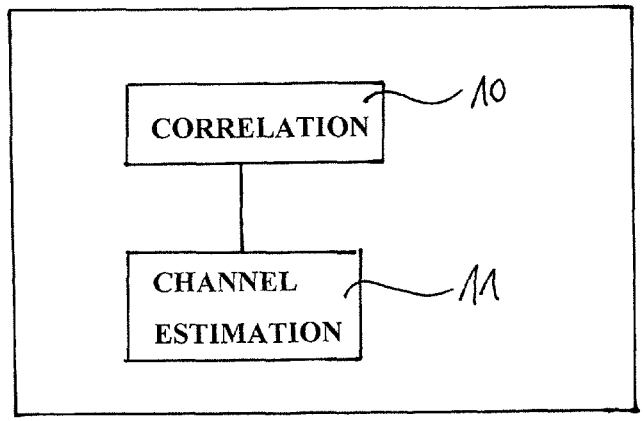
FIG. 5 is a schematic block diagram of a receiver circuit 500 in accordance with the disclosure.
Figure 6:
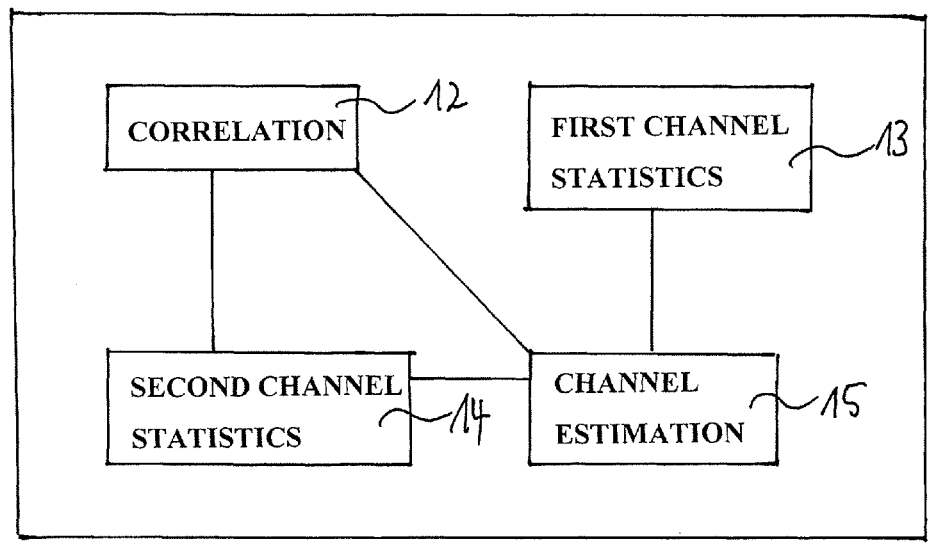
FIG. 6 is a schematic block diagram of a receiver circuit 600 in accordance with the disclosure.
Figure 7:
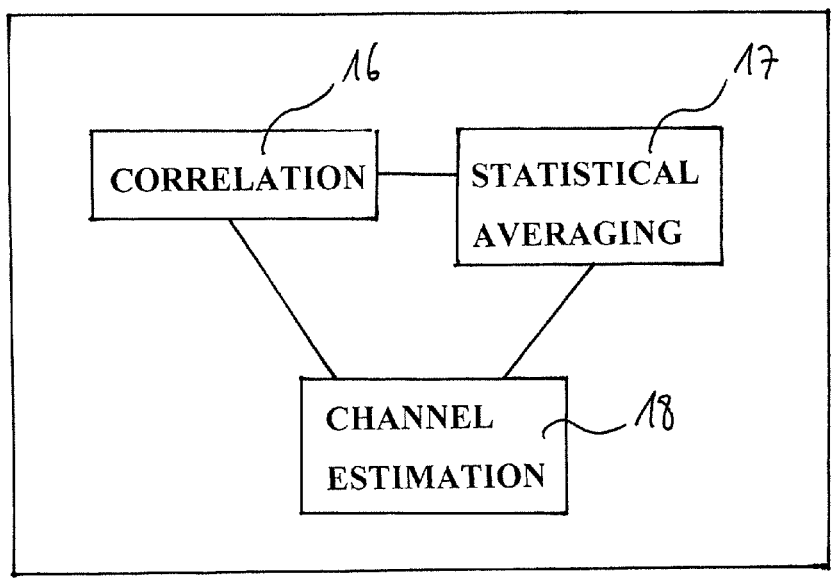
FIG. 7 is a schematic block diagram of a receiver circuit 700 in accordance with the disclosure.

FIGS. 5, 6 and 7 illustrate receiver circuits 500, 600 and 700 in accordance with the disclosure. It is understood that besides illustrated components, the receiver circuits may include further components which are not shown for the sake of simplicity. In addition, the receiver circuits may include one or more (electrical) connections between included components required to perform one or more steps of the above described schemes.

FIG. 5 schematically illustrates a receiver circuit 500 in accordance with the disclosure. An operation of the receiver circuit 500 may be read in connection with the method 200 of FIG. 2, but is not so limited. The receiver circuit 500 includes a unit 10 configured to correlate a received signal with a pilot sequence to determine a correlation result (see method step 1 of method 200). The receiver circuit 500 further includes a unit 11 configured to determine a channel estimate based on a Minimum Mean Square Error scheme which is conditional to an observed parameter wherein the observed parameter comprises the correlation result (see method step 2 of method 200).

For example, the receiver circuit 500 may include one or more additional components configured to perform any method step described in this specification. In particular, the receiver circuit 500 may further include a unit configured to determine at least one filter coefficient based on the determined channel estimate (e.g. according to one of equations (54) and (61)) and a filter (or equalizer) configured to filter the received signal based on the at least one filter coefficient. Moreover, the receiver circuit 500 may include a digital signal processor, an antenna port, a down-conversion mixer for down-converting received signals to an intermediate band or a baseband, a sampling unit for sampling a signal and/or an analogue/digital converter (ADC) for converting the analogue received signal into a digital signal. The ADC may particularly be arranged upstream of the units 10 and 11. The receiver circuit 500 may further include a despreader, a descrambler and/or a decoder (e.g. a turbo decoder or a Viterbi decoder), each of which may particularly be arranged downstream of the units 10 and 11. It is understood that the receiver circuit 500 may also be configured to operate as a transmitter circuit.

FIG. 6 schematically illustrates a receiver circuit 600 in accordance with the disclosure. An operation of the receiver circuit 600 may be read in connection with the method 300 of FIG. 3, but is not so limited. The receiver circuit 600 includes a unit 12 configured to correlate a received signal with a pilot sequence to determine a correlation result (see method step 3 of method 300). The receiver circuit 600 further includes a unit 13 configured to determine a first channel statistics based on the received signal (see method step 4 of method 300). The receiver circuit 600 further includes a unit 14 configured to determine a second channel statistics based on the correlation result (see method step 5 of method 300). The receiver circuit 600 further includes a unit 15 configured to determine a channel estimate based on a Minimum Mean Square Error scheme that is conditional to an observed parameter wherein the observed parameter comprises the correlation result and wherein the channel estimate depends on at least one of the first channel statistics and the second channel statistics (see method step 6 of method 300).

FIG. 7 schematically illustrates a receiver circuit 700 in accordance with the disclosure. An operation of the receiver circuit 700 may be read in connection with the method 400 of FIG. 4, but is not so limited. The receiver circuit 700 includes a unit 16 configured to correlate a received signal with a pilot sequence to determine a correlation result (see method step 7 of method 400). The receiver circuit 700 further includes a unit 17 configured to determine a statistical average of an error covariance matrix wherein the statistical average depends on the correlation result and on a statistical property of the received signal and wherein determining the statistical average of the error covariance matrix is independent of an explicit value of the pilot sequence (see method step 8 of method 400). The receiver circuit 700 further includes a unit 18 configured to determine a channel estimate based on a Minimum Mean Square Error scheme that is conditional to an observed parameter wherein the observed parameter comprises the correlation result and wherein the channel estimate depends on the statistical average of the error covariance matrix (see method step 9 of method 400).

In the following, various simulation results in accordance with above specified methods and receiver circuits are described. In this connection, various power delay profiles and parameters were used which are specified in Tables I to IV. Note that the simulated scenarios "Pedestrian A", "Pedestrian B" and "Vehicular A" are e.g. specified by 3GPP specifications.

Table I specifies power delay profiles for the scenario "Pedestrian A".

| Delay [µs] | Power [dB] |
| --- | --- |
| 0.0 | 0.0 |
| 0.11 | −9.7 |
| 0.19 | −19.2 |
| 0.410 | −22.8 |

Table II specifies power delay profiles for the scenario "Pedestrian B".

| Delay [µs] | Power [dB] |
| --- | --- |
| 0.0 | 0.0 |
| 0.2 | −0.9 |
| 0.8 | −4.9 |
| 1.2 | −8.0 |
| 2.3 | −7.8 |
| 3.7 | −23.9 |

Table III specifies power delay profiles for the scenario "Vehicular A".

| Delay [μs] | Power [dB] |
|---|---|
| 0.0 | 0.0 |
| 0.31 | −1.0 |
| 0.71 | −9.0 |
| 1.09 | −10.0 |
| 1.73 | −15.0 |
| 2.51 | −20.0 |

Table IV specifies various simulation parameters.

| | |
|---|---|
| Pilot power | −10 dB |
| HS-PDSCH power | −3 dB |
| HS-PDSCH codes | 8 |
| Other user channels | active |
| Correlation length N | 1280 chips |
| Channel estimation length L | 20 chips |
| Code rate | 2/3 |
| Maximum throughput | 4.688 Mbit/s |
| Modulation | 16 QAM |
| H-Set | 6 |
| Pulse shape | Root-raised cosine |
| Oversampling factor | 2 |
| Carrier frequency | 2 GHz |
| Chip rate | 3.84 MHz |
| Transport block size | 9377 bits |
| Symbol demapper | Max-log-MAP |

The simulations are based on a Doppler fading channel defining a channel time autocorrelation function as $$\varphi(n)=E(h_i(n_0(h_i^*(n_0+n)=J_0(2\pi f_d n T_c). \quad (62)$$

Here, $h_i(n)$ is an arbitrary channel tap at chip index n with mean power normalized to one, $J_0$ is the zero-order Bessel function of the first kind, $f_d=f_c\cdot v/c$ is the Doppler frequency, $f_c=2$ GHz is the carrier frequency, v is the mobile speed, $c=3\cdot10^8$ m/s is the speed of light, and $1/T_c=3.84$ MHz is the chip rate. A modified Jakes fading model is used for the implementation of the Doppler fading.

The equalizer coefficients are computed for each interval of N=1280 chips using the channel estimate for the same interval. The simulation results are averaged over 40000 slots at 3 km/h, 10000 slots at 30 km/h and 5000 slots at 120 km/h, and a minimum of 1000 bit errors. The power delay profiles are defined in Tables I to III. The multipath channel contains RRC pulse shaping filters at the transmitter and receiver with a length of 65 samples each. The receiver considers only a window with length L=20 of the entire channel. The window is positioned such that it contains the maximum amount of energy from the corresponding power delay profile. In case of the scenario Pedestrian B, which has the largest delay spread among the considered power delay profiles, the energy not covered by the channel estimation window contains only −37 dB of the total channel energy on average. For the channel statistics, the receiver may approximate this energy as white Gaussian noise. The simulation, including channel estimation and equalizer, uses an oversampling factor of 2. Note that oversampling was not considered above for notational convenience.

The BER results are evaluated at a despreader output for 8 High Speed Physical Downlink Shared Channel (HS-PDSCH) spreading codes with spreading factor 16 and total power of −3 dB relative to the total transmit power. The pilot sequence has spreading factor 256 and power −10 dB. The remaining transmit power is filled with 6 other user channels of spreading factor 128. The desired user channels are 16 QAM-modulated. All other channels are QPSK-modulated. The channel code is configured according to the H-Set 6 test case which is e.g. specified by the 3GPP standard, which is a turbo code with code rate 2/3 and a maximum throughput of 4.688 MBit/s.

Note that a computation of the MMSE channel estimate according to equation (45) may include a matrix-vector multiplication with the L×L matrix $C_h C_{\hat{h}}^{-1}$. The matrices $C_h$ and $C_v$ may be approximated as diagonal matrices (see FIGS. 9A to 9D) such that all subsequent operations may yield diagonal matrices. Assuming independently fading paths and white noise, as well as a fast decaying pulse shape, the matrices $C_h$ and $C_v$ may be close to diagonal.

Figure 8:
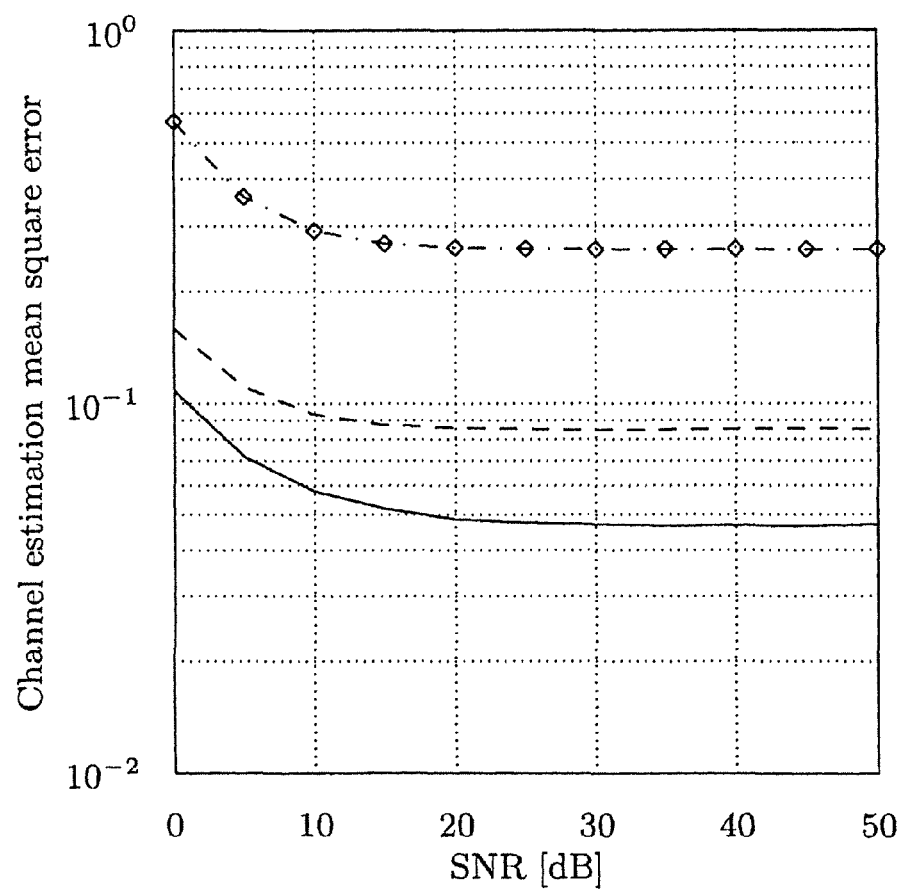
FIG. 8 is a graph that illustrates channel estimation mean square errors for various scenarios.
Figure 9A:
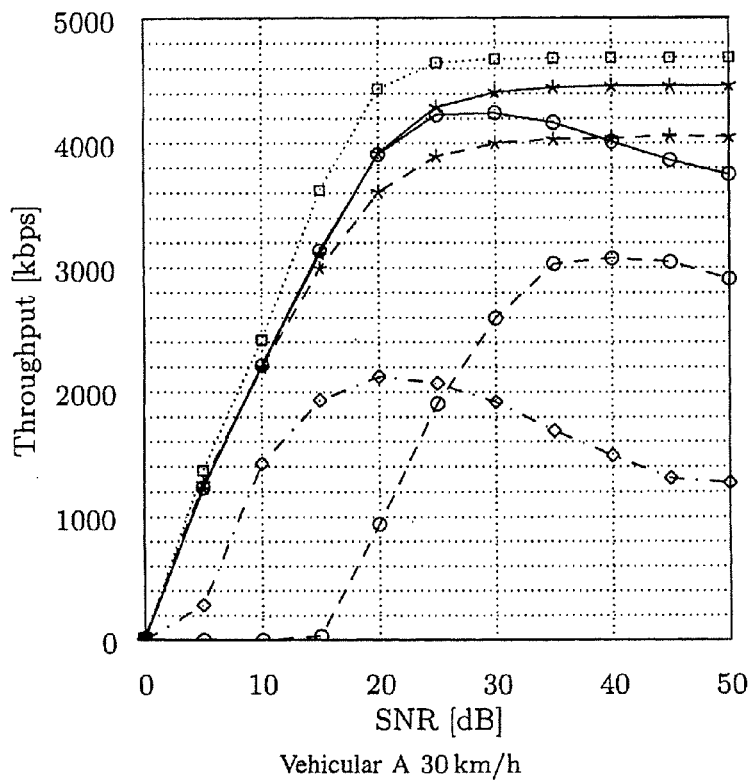
FIGS. 9A to 9D are graphs that illustrate throughputs for various scenarios.
Figure 9B:
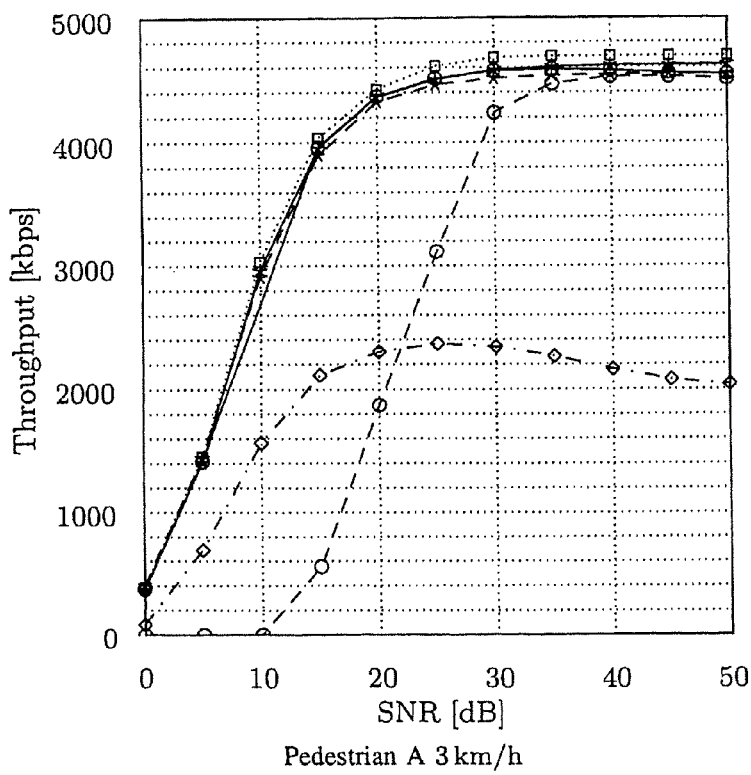
Figure 9C:
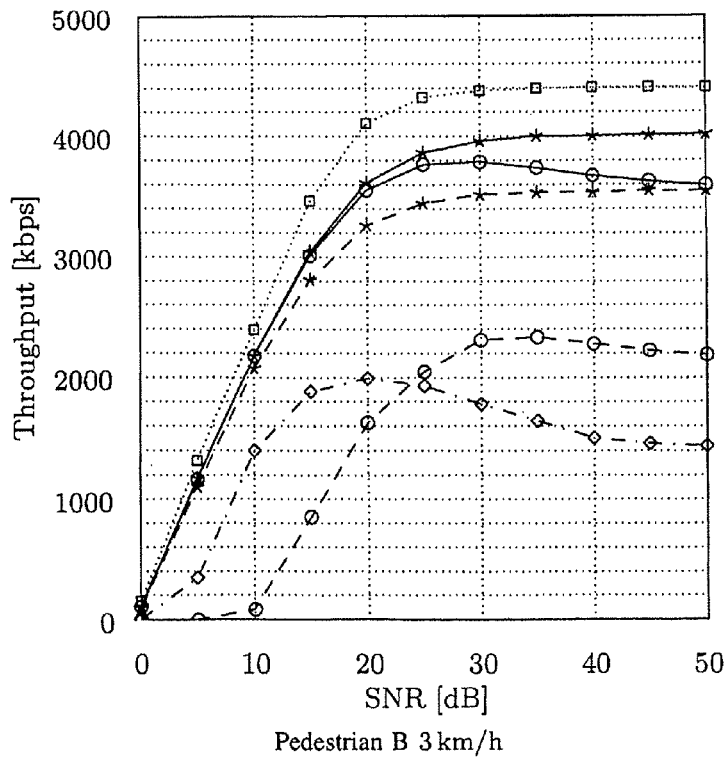
Figure 9D:
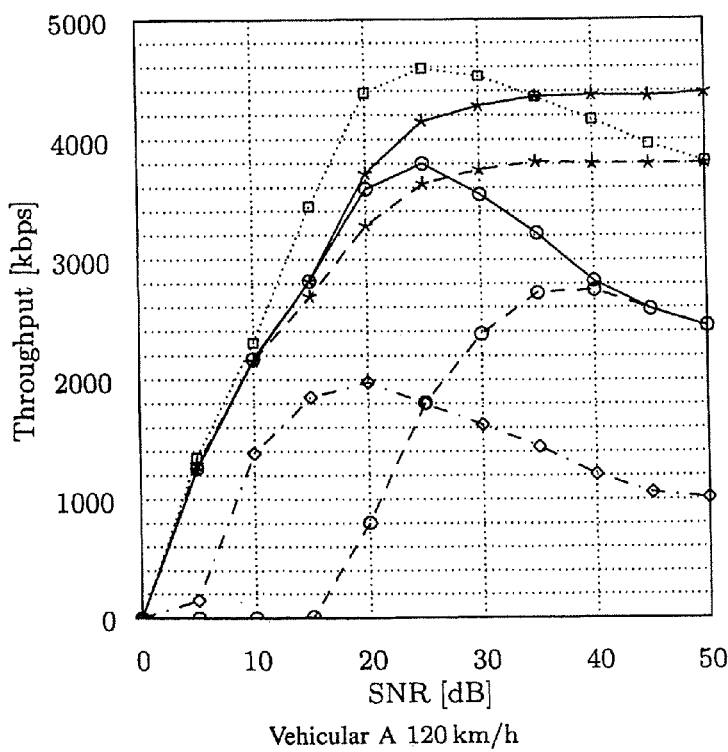

FIG. 8 illustrates a channel estimation mean square error $E(\|h-\hat{h}\|^2)$ for the Vehicular A power delay profile at 30 km/h mobile speed. A solid line illustrates an MMSE channel estimation using all entries of the matrix $C_h$. A dashed line illustrates an MMSE channel estimation using only diagonal entries of the matrix $C_h$. A dot-dashed line including diamonds refers to a simulation without MMSE channel estimation. Note that simulation parameters are specified by Table IV. From FIG. 8, it becomes apparent that MMSE channel estimation may reduce a channel estimation error in both low and high SNR regions.

FIGS. 9A to 9D illustrate throughput curves for $f_*$ and $f_o$, i.e., with and without channel estimation error considered in the equalizer coefficient computation. The throughputs performances may particularly be evaluated by means of Monte-Carlo simulations. Throughputs with (see stars) and without (see circles) channel estimation error compensation, with MMSE channel estimation using all entries of matrix $C_h$ (see solid lines) and using only diagonal entries of matrix $C_h$ (see dashed lines), without MMSE channel estimation (see dot-dashed lines including diamonds) and assuming the channel is known at the receiver (see dotted lines including squares) are shown. Note that simulation parameters are specified by Table IV.

While the invention has been illustrated and described with respect to one or more implementations, alterations and/or modifications may be made to the illustrated examples without departing from the spirit and scope of the appended claims. Also, techniques, systems, subsystems and methods described and illustrated in the various embodiments may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
   correlating a received signal received via a downlink channel with a pilot sequence by a correlation unit to determine a correlation result;
   determining a channel estimate for the downlink channel by an estimation unit based on a Minimum Mean Square Error scheme that is conditional to an observed parameter, wherein the observed parameter comprises the correlation result; and
   determining a statistical average of an error covariance matrix, wherein the statistical average depends on the correlation result between the received signal and the pilot sequence, and depends on a statistical property of the received signal.

2. The method of claim 1, wherein the pilot sequence comprises at least one of a spreading code and a scrambling code.

3. The method of claim 1, further comprising:
determining the error covariance matrix based on the correlation result.

4. The method of claim 1, wherein the channel estimate depends on the statistical average of the error covariance matrix.

5. The method of claim 1, wherein determining the statistical average of the error covariance matrix is independent of an explicit value of the pilot sequence.

6. The method of claim 1, further comprising:
determining a first channel statistics based on the received signal wherein the channel estimate depends on the first channel statistics.

7. The method of claim 6, further comprising:
determining a second channel statistics based on the correlation result wherein the channel estimate depends on the second channel statistics.

8. The method of claim 1, further comprising:
determining a first channel statistics based on the received signal; and
determining a second channel statistics based on the correlation result wherein the statistical average of the error covariance matrix depends on at least one of the first channel statistics and the second channel statistics.

9. The method of claim 1, further comprising:
determining at least one of a first channel statistics based on the received signal and a second channel statistics based on the correlation result; and
approximating at least one of the determined channel statistics by a diagonal matrix, respectively.

10. The method of claim 1, further comprising:
determining at least one filter coefficient based on the determined channel estimate.

11. The method of claim 10, wherein the at least one filter coefficient depends on a channel estimation error statistics.

12. The method of claim 10, further comprising:
filtering the received signal based on the at least one filter coefficient.

13. A method, comprising:
correlating a received signal received via a downlink channel with a pilot sequence by a correlation unit to determine a correlation result;
determining a first channel statistics based on the received signal, wherein the first channel statistics is determined based on an estimator $\hat{C}_y$, wherein $$\hat{C}_y = \frac{1}{M}\sum_{m=1}^{M} y(m)y^H(m),$$

wherein M is an averaging length, y is a received signal vector, and $y^H$ is a conjugate transpose of the received signal vector;
determining a second channel statistics based on the correlation result; and
determining a channel estimate for the downlink channel by an estimation unit based on a Minimum Mean Square Error scheme that is conditional to an observed parameter, wherein the observed parameter comprises the correlation result and wherein the channel estimate depends on at least one of the first channel statistics and the second channel statistics.

14. A method, comprising:
correlating a received signal received via a downlink channel with a pilot sequence by a correlation unit to determine a correlation result;
determining a statistical average of an error covariance matrix, wherein the statistical average depends on the correlation result and on a statistical property of the received signal, and wherein determining the statistical average of the error covariance matrix is independent of an explicit value of the pilot sequence; and
determining a channel estimate for the downlink channel by an estimation unit based on a Minimum Mean Square Error scheme that is conditional to an observed parameter, wherein the observed parameter comprises the correlation result, and wherein the channel estimate depends on the statistical average of the error covariance matrix.

15. A receiver circuit, comprising:
a correlation unit configured to correlate a received signal received via a downlink channel with a pilot sequence to determine a correlation result; and
an estimation unit configured to determine a channel estimate for the downlink channel based on a Minimum Mean Square Error scheme that is conditional to an observed parameter, wherein the observed parameter comprises the correlation result, wherein the estimation unit is configured to determine a statistical average of an error covariance matrix, wherein the statistical average depends on the correlation result between the received signal and the pilot sequence, and depends on a statistical property of the received signal.

16. The receiver circuit of claim 15, further comprising:
a unit configured to determine a first channel statistics based on the received signal, wherein the channel estimate depends on the first channel statistics.

17. The receiver circuit of claim 16, further comprising:
a unit configured to determine a second channel statistics based on the correlation result, wherein the channel estimate depends on the second channel statistics.

18. The receiver circuit of claim 15, further comprising:
a unit configured to determine at least one filter coefficient based on the determined channel estimate.

19. The receiver circuit of claim 18, further comprising:
a filter configured to filter the received signal based on the at least one filter coefficient.

20. The method of claim 19, wherein the at least one filter coefficient depends on a channel estimation error statistics.

21. The receiver circuit of claim 19, wherein the filter comprises a finite impulse response (FIR) filter.

22. A receiver circuit, comprising:
a correlation unit configured to correlate a received signal received via a downlink channel with a pilot sequence to determine a correlation result;
a unit configured to determine a first channel statistics based on the received signal, wherein the first channel statistics is based on a Toeplitz matrix;
a unit configured to determine a second channel statistics based on the correlation result; and
an estimation unit configured to determine a channel estimate for the downlink channel based on a Minimum Mean Square Error scheme that is conditional to an observed parameter, wherein the observed parameter comprises the correlation result, and wherein the channel estimate depends on at least one of the first channel statistics and the second channel statistics.

23. The method of claim 1, wherein a result of the Minimum Mean Square Error scheme minimizes a mean square error and provides the observed parameter.

* * * * *